(12) United States Patent
Fujiwara et al.

(10) Patent No.: US 7,546,468 B2
(45) Date of Patent: Jun. 9, 2009

(54) PROGRAM UPDATE METHOD AND SERVER

(75) Inventors: Makoto Fujiwara, Kyoto (JP); Yusuke Nemoto, Hyogo (JP); Junichi Yasui, Osaka (JP); Takuji Maeda, Osaka (JP); Takayuki Ito, Osaka (JP); Yasushi Yamada, Aichi (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 685 days.

(21) Appl. No.: 10/696,621

(22) Filed: Oct. 30, 2003

(65) Prior Publication Data

US 2004/0105548 A1 Jun. 3, 2004

(30) Foreign Application Priority Data

Nov. 15, 2002 (JP) ............................. 2002-331992

(51) Int. Cl.
*H04L 9/00* (2006.01)
(52) U.S. Cl. .................... 713/176; 380/45; 380/202; 380/259; 380/277; 380/278; 380/279; 380/281; 380/284; 713/159; 713/168; 713/190; 713/191; 713/193; 713/194; 726/23; 726/27
(58) Field of Classification Search ................ 713/159, 713/168, 176, 190–191, 193–194; 726/27, 726/23; 380/45, 277–279, 202, 259, 281, 380/284

See application file for complete search history.

(56) References Cited

U.S. PATENT DOCUMENTS

| | | | |
|---|---|---|---|
| 4,218,738 A | 8/1980 | Matyas et al. | |
| 4,864,615 A | 9/1989 | Bennett et al. | |
| 4,941,176 A * | 7/1990 | Matyas et al. | ............... 380/280 |
| 5,307,497 A | 4/1994 | Feigenbaum et al. | |
| 5,416,840 A * | 5/1995 | Cane et al. | ..................... 705/52 |
| 5,666,411 A | 9/1997 | McCarty | |
| 5,701,492 A * | 12/1997 | Wadsworth et al. | ......... 717/173 |
| 5,771,287 A | 6/1998 | Gilley et al. | |
| 5,812,671 A | 9/1998 | Ross, Jr. | |
| 5,892,900 A | 4/1999 | Ginter et al. | |
| 5,915,025 A * | 6/1999 | Taguchi et al. | ................ 380/44 |

(Continued)

FOREIGN PATENT DOCUMENTS

CN 1131992 9/1996

(Continued)

OTHER PUBLICATIONS

Japanese Office Action issued in Japanese Patent Application No. 2002-215096 dated Mar. 6, 2007.

(Continued)

*Primary Examiner*—Carl Colin
(74) *Attorney, Agent, or Firm*—McDermott Will & Emery LLP

(57) ABSTRACT

A system including a secure LSI 1 establishes a communication path to/from a server 3 (UD1), and receives a common key-encrypted program generated by encryption with a common key and transmitted from the server 3 (UD6 and UD7). The received common key-encrypted program is decrypted to generate a raw program, and the raw program is re-encrypted with an inherent key to newly generate an inherent key-encrypted program, which is stored in an external memory.

8 Claims, 13 Drawing Sheets

U.S. PATENT DOCUMENTS

| | | | |
|---|---|---|---|
| 5,999,629 | A | 12/1999 | Heer et al. |
| 6,189,146 | B1* | 2/2001 | Misra et al. ................. 717/177 |
| 6,226,618 | B1 | 5/2001 | Downs et al. |
| 6,333,983 | B1* | 12/2001 | Enichen et al. ............. 380/273 |
| 6,367,019 | B1* | 4/2002 | Ansell et al. .................. 726/26 |
| 6,421,779 | B1 | 7/2002 | Kuroda et al. |
| 6,577,734 | B1* | 6/2003 | Etzel et al. .................. 380/277 |
| 6,834,111 | B1 | 12/2004 | Nishimura et al. |
| 6,915,434 | B1* | 7/2005 | Kuroda et al. ............... 713/193 |
| 6,970,565 | B1* | 11/2005 | Rindsberg ................... 380/270 |
| 6,988,199 | B2 | 1/2006 | Toh et al. ..................... 713/170 |
| 6,990,582 | B2* | 1/2006 | Maruyama ................... 713/170 |
| 7,003,107 | B2* | 2/2006 | Ananth ........................ 380/37 |
| 7,062,718 | B2 | 6/2006 | Kodosky et al. |
| RE39,166 | E | 7/2006 | Gammie |
| 7,099,826 | B2* | 8/2006 | Akabane et al. ............. 704/260 |
| 7,110,984 | B1* | 9/2006 | Spagna et al. ................. 705/57 |
| 7,117,352 | B1 | 10/2006 | Giles et al. |
| 7,133,524 | B2* | 11/2006 | Fujiwara et al. ............... 380/45 |
| 7,167,564 | B2 | 1/2007 | Asano et al. |
| 7,194,090 | B2* | 3/2007 | Muratani et al. ............. 380/29 |
| 7,219,227 | B2* | 5/2007 | Hori et al. ................... 713/158 |
| 7,222,338 | B2* | 5/2007 | Bae ............................. 717/168 |
| 7,310,731 | B2* | 12/2007 | Ishibashi et al. ............. 713/170 |
| 2001/0056539 | A1 | 12/2001 | Pavlin et al. |
| 2002/0002466 | A1* | 1/2002 | Kambayashi et al. .......... 705/1 |
| 2002/0021804 | A1* | 2/2002 | Ledzius et al. ................ 380/44 |
| 2002/0048367 | A1 | 4/2002 | Maillard |
| 2002/0078380 | A1 | 6/2002 | Lin et al. |
| 2002/0095382 | A1* | 7/2002 | Taoka et al. ................... 705/50 |
| 2002/0116625 | A1* | 8/2002 | Sato ........................... 713/194 |
| 2002/0116632 | A1 | 8/2002 | Itoh et al. |
| 2002/0129245 | A1* | 9/2002 | Cassagnol et al. ........... 713/168 |
| 2002/0184512 | A1 | 12/2002 | Cardoso, Jr. |
| 2003/0056107 | A1* | 3/2003 | Cammack et al. ........... 713/189 |
| 2003/0217193 | A1 | 11/2003 | Thurston et al. |
| 2004/0088176 | A1* | 5/2004 | Rajamani ....................... 705/1 |
| 2007/0217614 | A1* | 9/2007 | Fujiwara et al. ............. 380/277 |

FOREIGN PATENT DOCUMENTS

| | | |
|---|---|---|
| CN | 1279861 A | 1/2001 |
| CN | 1302399 | 7/2001 |
| CN | 1307284 A | 8/2001 |
| CN | 1342007 | 3/2002 |
| EP | 718 756 A1 | 6/1996 |
| EP | 1 083 480 A1 | 3/2001 |
| EP | 1 119 131 A2 | 7/2001 |
| EP | 1 126 355 A1 | 8/2001 |
| EP | 1 202 150 A2 | 5/2002 |
| EP | 1 217 850 A1 | 6/2002 |
| GB | 2 336 005 A | 10/1999 |
| JP | 11-282667 | 10/1999 |
| JP | 2000-122931 | 4/2000 |
| JP | P2000-347847 A | 12/2000 |
| JP | P2000-347852 A | 12/2000 |
| JP | 2001-211149 | 8/2001 |
| JP | 2002-251326 | 9/2002 |
| JP | 2002-279376 | 9/2002 |
| JP | P2003-101527 A | 4/2003 |
| WO | WO 00/57258 | 9/2000 |

OTHER PUBLICATIONS

Partial European Search Report issued in European Patent Application No. EP 03016912.2-2211, dated on Oct. 22, 2007.

Kessler, M. P., "Security Sensitive Software Development," ICCST, Zurich, Switzerland, 1989, p. 89-91.

U.S. Office Action issued in U.S. Appl. No. 10/624,481, dated Jul. 5, 2007.

U.S. Appl. No. 10/624,481, filed Jul. 23, 2003, entitled "Program Development Method, Program Development System, and Program Installation Method."

* cited by examiner

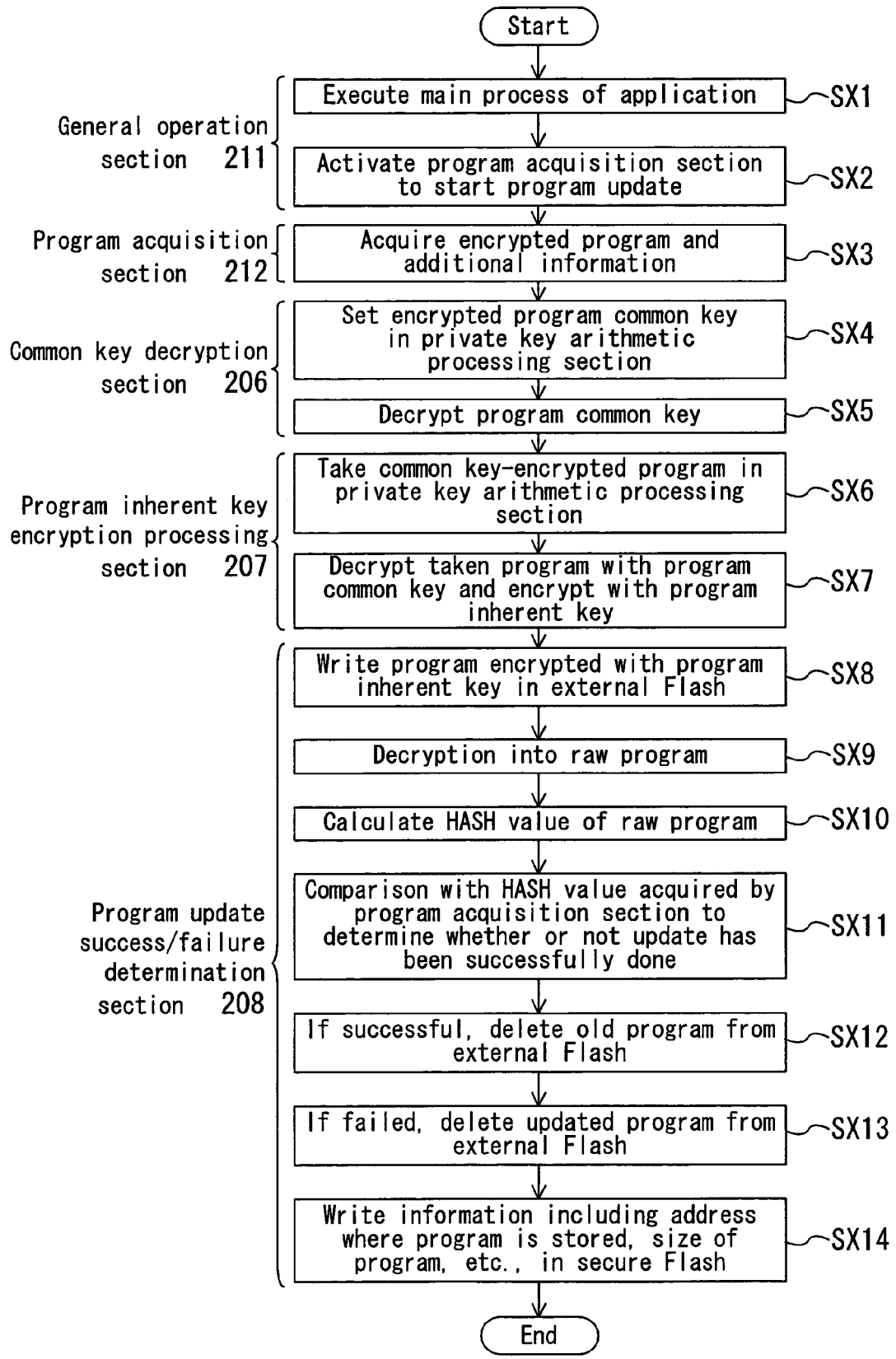

PROGRAM UPDATE METHOD AND SERVER

BACKGROUND OF THE INVENTION

1. Field of the Invention

The present invention relates to a technique for updating a program while maintaining security in a key-installed system or an LSI device used for such a system.

2. Description of the Related Art

Conventionally, for the purpose of protecting a program for operating an LSI device from fraudulent processing, a program encrypted with a predetermined manufacturer key is stored in a memory and decrypted with the key for execution. However, with such a system, a program encrypted with a common manufacturer key is executed in a large number of LSI devices, and thus, if information of the manufacturer key is fraudulently leaked even from a single product, it becomes possible to commit tampering of programs in a large number of products. Therefore, the security cannot be improved.

In a method conceived for the purpose of overcoming such a problem, a program for operating LSI devices is encrypted with an inherent key unique to each LSI device, and a product can execute only a program encrypted with an inherent key unique to the product (see Japanese Patent Applications Nos. 2002-215096 and 2002-258481). Such a method improves the security because fraudulent leakage of key information from a single product causes no effect on the other products. As a premise of this method, a method for encrypting a key twice was conceived (see Japanese Unexamined Patent Publication No. 2003-101527).

In general, updating of a program installed in a product LSI device is achieved by securing a safe communication path by an SSL connection and transmitting a raw program or a program encrypted with a manufacturer key from a server to the LSI device. However, with this method, if the communication path is fraudulently accessed, a program executable in a large number of products can be fraudulently read out, so that the security in program update is not improved.

In the case where the above method is used for the purpose of overcoming such a problem, a raw program or a program encrypted with a manufacturer key cannot be executed in an LSI device without any additional processing because the LSI device executes only a program encrypted with its own inherent key.

In another possible method, programs encrypted with different keys for respective LSI devices are prepared in a server and key information is managed for each LSI device. The programs encrypted with different keys for respective LSI devices are transmitted from the server to the LSI devices. However, this method requires enormous efforts and cost and therefore is not practical.

SUMMARY OF THE INVENTION

An objective of the present invention is to provide a method for updating a program while maintaining high security in an LSI device capable of executing a program encrypted with an inherent key unique to the LSI device.

An aspect of the present invention is a method for updating an inherent key-encrypted program in a system including an LSI device and an external memory, the inherent key-encrypted program being generated by encryption with an inherent key unique to the LSI device and being stored in the external memory, the method comprising: a first step of receiving by the system a common key-encrypted program generated by encryption with a common key and transmitted from a server; a second step of decrypting by the system the received common key-encrypted program to generate a raw program; and a third step of re-encrypting by the system the raw program with the inherent key and storing the re-encrypted program in the external memory as a new inherent key-encrypted program.

The program update method of the present invention preferably further comprises the steps of: receiving by the system common key information transmitted from the server; and generating by the system a raw common key using the received common key information, wherein at the second step, the raw common key is used to decrypt the common key-encrypted program.

The common key information preferably includes an encrypted common key generated by encrypting the raw common key with a raw first intermediate key, and an encrypted first intermediate key generated by encrypting the raw first intermediate key with a raw second intermediate key.

In the program update method of the present invention, the LSI device includes an internal memory in which inherent key information is stored; the system uses the inherent key information stored in the internal memory to generate a raw inherent key at boot-up of the system; and at the third step, the raw inherent key is used for re-encrypting the raw program.

The inherent key information preferably includes an encrypted inherent key generated by encrypting the raw inherent key with a raw third intermediate key and an encrypted second intermediate key generated by encrypting the raw third intermediate key with a raw fourth intermediate key. Alternatively, the generated raw inherent key is preferably stored in a register of the LSI device and is used for decrypting the inherent key-encrypted program to a raw program for execution of the inherent key-encrypted program.

In the program update method of the present invention, the LSI device preferably includes a boot ROM in which a boot program is stored; the external memory preferably includes an acquisition program for establishing data transmission between the LSI device and a server; and the system preferably executes reception of the common key-encrypted program based on the acquisition program stored in the external memory, and controls update processing performed after the reception of the common key-encrypted program based on the boot program stored in the boot ROM.

The program update method of the present invention preferably further comprises the step of receiving a HASH value of the raw program transmitted from the server, wherein at the second step, the received HASH value is used to perform a HASH verification on the decrypted raw program.

Another aspect of the present invention is a server which operates for program update in a system including an LSI device, the server executing: a first step of receiving from the system an ID of the LSI device and an application ID which is identification information of an update object program; a second step of referring a first table which indicates correspondences between application IDs and LSI IDs to determine whether or not the update object program is transmitted to the system; and if it is determined at the second step that the update object program is transmitted to the system, a third step of transmitting to the system a common key-encrypted program generated by encrypting the update object program with a common key and common key information from which the common key is derived.

The server of the present invention preferably executes: a fourth step of receiving from the system a signal which requests application inherent information necessary for execution of the update object program; and a fifth step of referring to a second table which indicates correspondence between a transmission history of the application inherent information and the LSI IDs to determine whether or not the application inherent information requested at the fourth step is transmitted.

In the server of the present invention, the common key information preferably includes an encrypted common key generated by encrypting a raw common key with a raw first intermediate key and an encrypted first intermediate key generated by encrypting the raw first intermediate key with a raw second intermediate key.

BRIEF DESCRIPTION OF THE DRAWINGS

FIG. 13 is a flowchart which illustrates program update processing.

DESCRIPTION OF THE PREFERRED EMBODIMENTS

Hereinafter, an embodiment of the present invention is described with reference to the drawings. Note that, in the following descriptions, an encrypted key or program which is obtained by encrypting a key or program X using a key Y is represented as "Enc (X, Y)".

Figure 1:
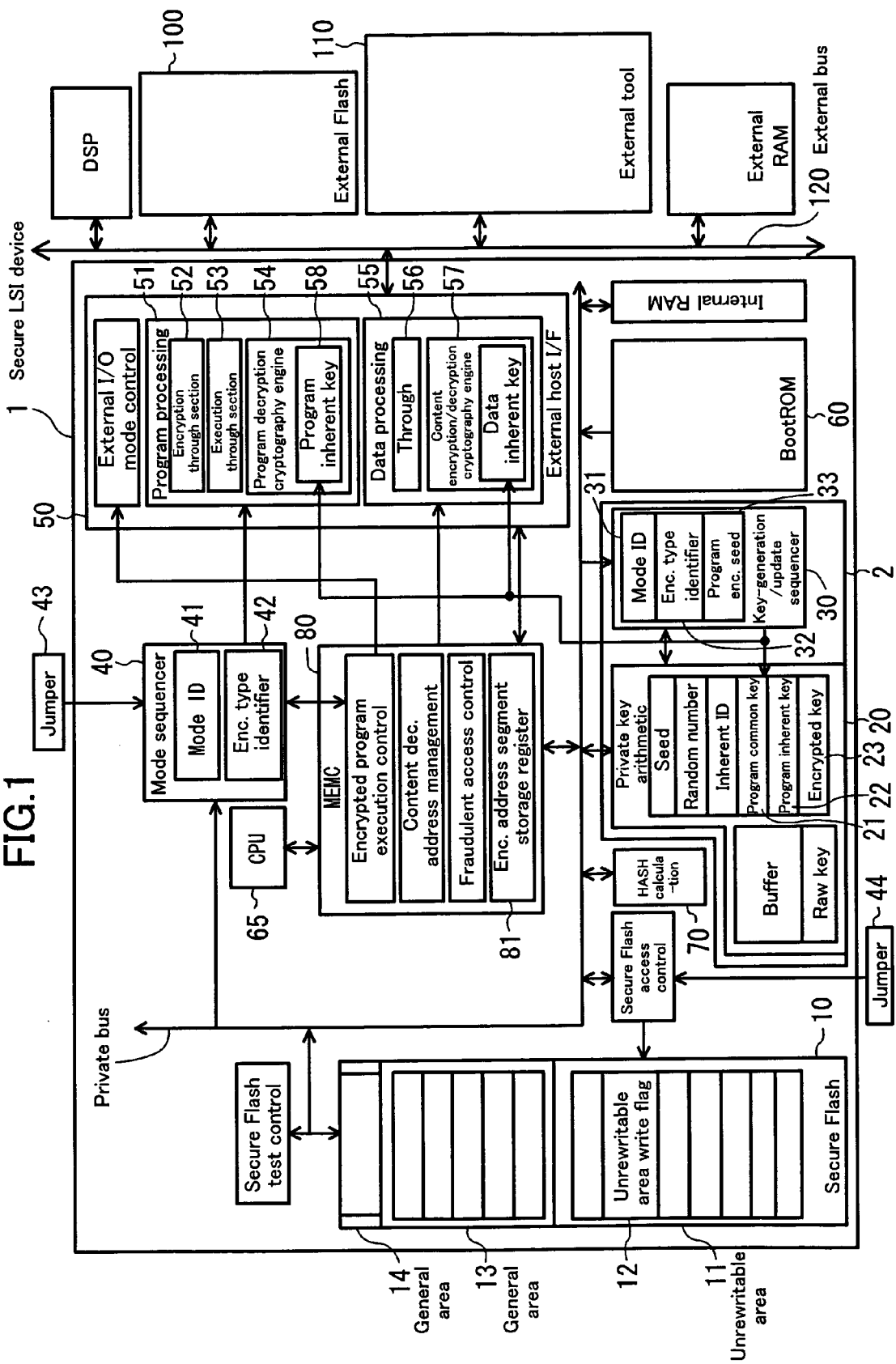
FIG. 1 is a block diagram showing a structure of a secure LSI device according to an embodiment of the present invention.

FIG. 1 is a block diagram showing an internal structure of a secure LSI device, which is a semiconductor device of the present embodiment. In FIG. 1, the secure LSI device 1 can be connected to an external memory (flash memory) 100, an external tool 110, or the like, through an external bus 120. The operation mode of the secure LSI device 1 can be set by supplying a mode ID to the secure LSI device 1.

Major components of the secure LSI device 1, which are relevant to the following descriptions, are briefly described.

The secure LSI device 1 has a secure memory (e.g., secure Flash) 10 including an unrewritable area 11. The unrewritable area 11 includes an unrewritable area write flag 12. When a mode ID is once written in the secure memory 10, the flag value of the unrewritable area write flag 12 is changed from "WRITABLE" to "WRITTEN", and writing in the unrewritable area 11 is thereafter prohibited. It should be noted that the secure memory 10 and the external memory 100 are made of flash memories in the present embodiment, but the present invention is not limited thereto. Any type of memory may be used so long as it is nonvolatile.

An encryption section 2 performs encryption and decryption of programs. The encryption section 2 includes a private key arithmetic processing section 20 and a key-generation/update sequencer 30. The private key arithmetic processing section 20 includes registers for storing various keys and a program encryption seed (a program common key storage register 21, a program inherent key storage register 22, an encryption key storage register 23, etc.), and is capable of executing a plurality of sequences including processes for encrypting or decrypting programs. The key-generation/update sequencer 30 determines whether to permit execution of each of the sequences which can be executed by the private key arithmetic processing section 20, and prohibits the operation of the private key arithmetic processing section 20 with respect to a sequence whose execution is determined to be impermissible. The key-generation/update sequencer 30 includes a mode ID storage register 31. The key-generation/update sequencer 30 determines whether to permit execution of each sequence based on the mode ID stored in the mode ID storage register 31. Furthermore, the key-generation/update sequencer 30 includes an encryption type identifier storage register 32 for storing an encryption type identifier and a storage section 33 for storing the program encryption seed. The encryption type identifier indicates what algorithm and key length are used for encrypting a key or program.

A mode sequencer 40 also includes a mode ID storage register 41. The mode sequencer 40 controls the operation of an external host interface (I/F) 50, i.e., which interface is used for reading a program or data stored in the external memory 100, according to a mode ID stored in the mode ID storage register 41 and the value of a jumper 43. With this arrangement, it is possible to control whether or not a raw (binary) program stored in the external memory 100 can be executed. The mode sequencer 40 further includes an encryption type identifier storage register 42 for storing an encryption type identifier. The encryption type identifier indicates what method is used for encrypting a key.

The external host I/F 50 transmits/receives a program or data to/from the external memory 100 or the external tool 110 according to the control by the mode sequencer 40 through any of a through section 52 for encryption (hereinafter, "encryption through section 52"), a through section 53 for execution (hereinafter, "execution through section 53"), and a cryptography engine 54 for program decryption (hereinafter, "program decryption cryptography engine 54"), which are included in a program processing section 51, and a through section 56 and a cryptography engine 57 for content encryption/decryption, which are included in a data processing section 55. The program decryption cryptography engine 54 includes a program inherent key storage register 58 for storing a program inherent key which is used for decrypting a program.

In the key generation mode and product operation mode (described later), a program cannot be taken in through the execution through section 53. That is, the secure LSI device 1 is structured such that the operation of the secure LSI device 1 does not proceed to a program except for a program encrypted with an inherent key when the secure LSI device 1 is in the key generation mode or product operation mode.

A boot ROM 60 stores a boot program for controlling the boot-up operation of the secure LSI device 1. A HASH calculation section 70 calculates a HASH value for verifying the validity of a program read into the secure LSI device 1.

Further, the external memory 100 stores programs and contents. The external tool 110 stores various initial values which are to be transferred to and stored in the secure memory 10 at the time of the first boot-up of the secure LSI device 1. The type of the initial value varies depending on a selected operation mode.

Figure 2:
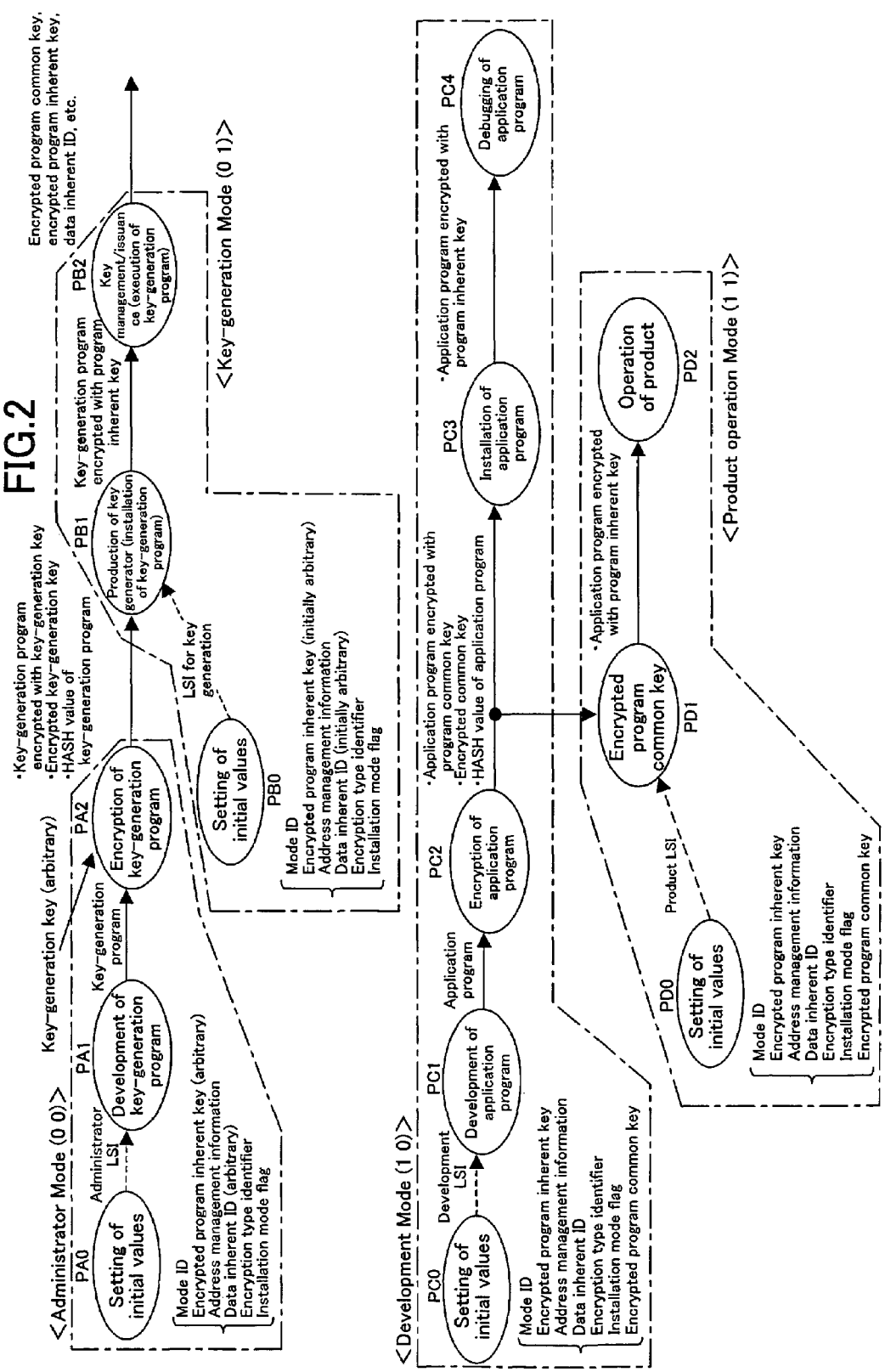
FIG. 2 illustrates an entire flow of development and manufacture which use the secure LSI device of FIG. 1.

FIG. 2 shows the entire flow of development and manufacture which use the secure LSI device 1 of FIG. 1. As shown in FIG. 2, the secure LSI device 1 operates in the following four operation modes: administrator mode (mode ID: 00), key-generation mode (mode ID: 01), development mode (mode ID: 10), and product operation mode (mode ID: 11).

When being set to the administrator mode, the secure LSI device 1 operates as an LSI device for an administrator (hereinafter, referred to as "administrator LSI device"). In the administrator LSI device, a key-generation program is developed (PA1), and the developed key-generation program is encrypted using any key-generation key (PA2).

When being set to the key-generation mode, the secure LSI device 1 operates as an LSI device for key generation (hereinafter, referred to as "key-generation LSI device"). In the key-generation LSI device, the encrypted key-generation program generated in the administrator LSI device is installed (PB1), and the key-generation program is executed to generate various keys (PB2).

When being set to the development mode, the secure LSI device 1 operates as an LSI device for development (hereinafter, referred to as "development LSI device"). In the development LSI device, an application program which is to be executed in an actual product is developed (PC1). The application program is encrypted using the program common key (PC2).

When being set to the product operation mode, the secure LSI device 1 operates as an actual product LSI device. The application program generated in the development LSI device and encrypted with the program common key is installed in the product LSI device. Inside the product LSI device, the installed application program is converted to an application program encrypted with a program inherent key (PD1). After the conversion of the application program, the secure LSI device 1 operates as a normal product LSI device (PD2). This conversion processing can be executed also in the development LSI device for the purpose of debugging the application program (PC3).

Hereinafter, details of a normal operation and a secure update operation, which are performed when the secure LSI device 1 having the above structure is in the product operation mode, are described with reference to flowcharts and data flows.

Figure 3:
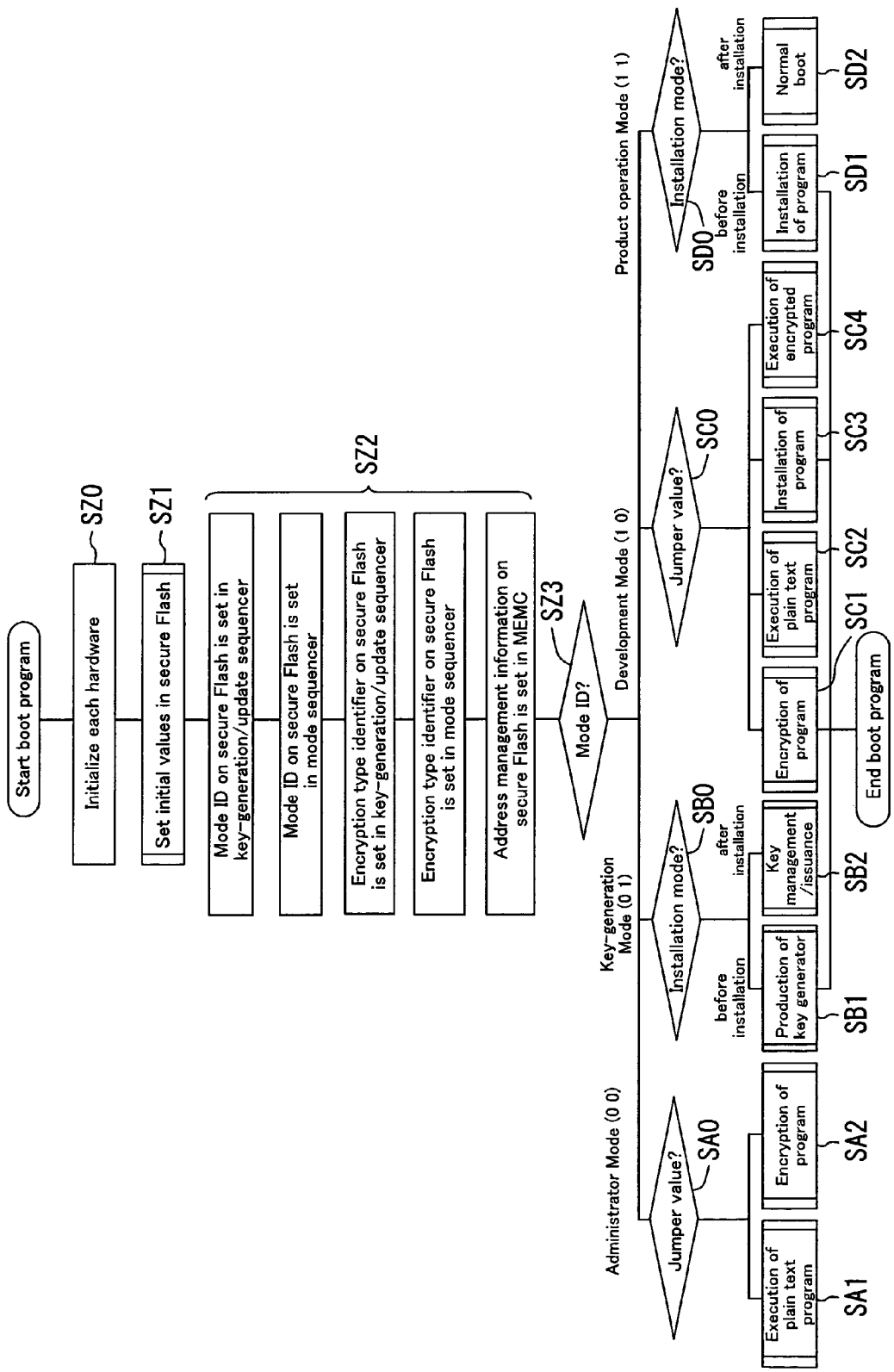
FIG. 3 is a flowchart which illustrates the entire flow of a boot program.

FIG. 3 is a flowchart which illustrates the entire process of the boot program. When the secure LSI device 1 is powered on, the boot program stored in the boot ROM 60 is executed by a CPU 65. Referring to FIG. 3, each hardware is first initialized (SZ0). Then, various initial values are read from the external tool 110 and set in the secure memory 10 (SZ1).

Figure 4:
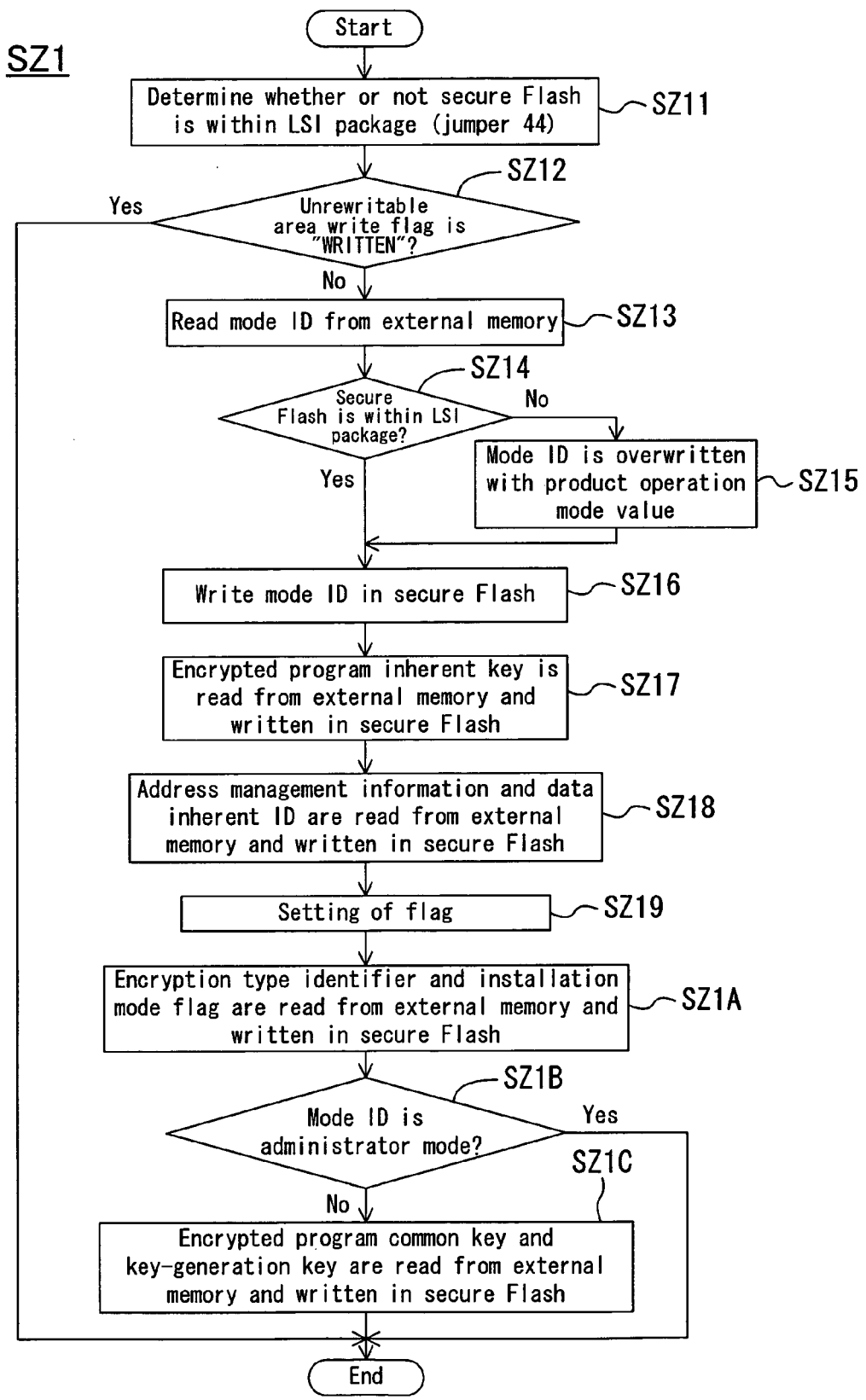
FIG. 4 is a dataflow of initial value setting processing SZ1.

FIG. 4 is a flowchart which illustrates the initial value setting processing SZ1. In the first place, at a jumper 44, it is determined whether or not the secure memory 10 is mounted in the LSI device (SZ11). Next, it is determined whether or not the unrewritable area write flag 12 indicates "WRITTEN" (SZ12). When it indicates "WRITTEN" (Yes at SZ12), the processing SZ1 is ended because an initial value is already set in the secure memory 10. When the unrewritable area write flag 12 indicates "WRITABLE" (No at SZ12), initial values are written in the secure memory 10 (SZ13 to SZ18). In addition to the mode ID, an encrypted program inherent key, address management information and data inherent key are written in the unrewritable area 11 of the secure memory 10. If the first determination indicates that the secure memory 10 exists outside the LSI device (No at SZ14), the mode ID is overwritten with a value that indicates the product operation mode (SZ15). As a result, a fraudulent product which has a secure memory 10 outside its LSI package operates only when it is in the product operation mode.

Next, the unrewritable area write flag 12 is set to "WRITTEN" (SZ19), whereby rewriting in the unrewritable area 11 is thereafter prohibited. Further, an encryption type identifier and an installation mode flag are written in general areas 13 and 14 (SZ1A). When the mode ID indicates a mode other than the administrator mode (No at SZ1B), an encrypted common key and an encrypted key-generation key are written in the general areas 13 and 14 in addition to the encryption type identifier and installation mode flag (SZ1C).

Thereafter, preprocessing SZ2 is executed. Herein, the mode ID set in the unrewritable area 11 of the secure memory 10 is set in the mode ID storage register 31 of the key-generation/update sequencer 30 and in the mode ID storage register 41 of the mode sequencer 40. Further, the encryption type identifier set in the general area 13 of the secure memory 10 is set in the encryption type identifier storage register 32 of the key-generation/update sequencer 30 and in the encryption type identifier storage register 42 of the mode sequencer 40. Furthermore, the address management information stored in the unrewritable area 11 of the secure memory 10 is set in an encryption address segment storage register 81 of an MEMC 80. The processes described hereinabove correspond to initial value setting phases PA0, PB0, PC0 and PD0 of FIG. 2.

Thereafter, the operation is performed in a mode determined according to the value of the mode ID (SZ3). Thus, the confidentiality of a program is improved by restricting the operation performed in a secure LSI device according to the value of the mode ID.

Next, a normal product operation (normal boot process) is described in detail.

When the mode ID is "11", the secure LSI device 1 is set to the product operation mode to execute program installation processing SD1 or normal boot processing SD2 depending on the value of the installation mode flag (determined at SD0).

Figure 5:
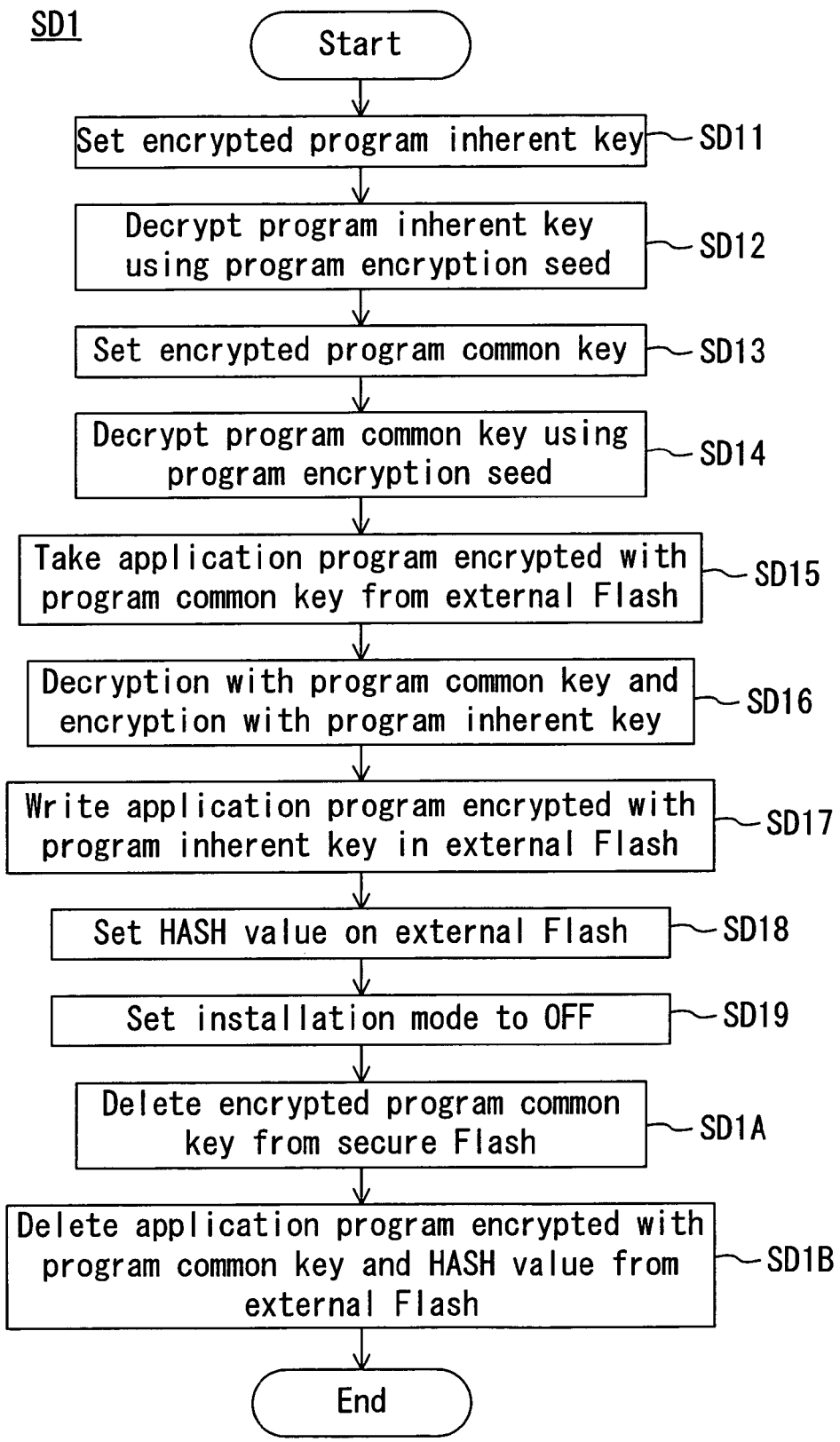
FIG. 5 is a flowchart of program installation processing SD1 in the product operation mode.
Figure 6:
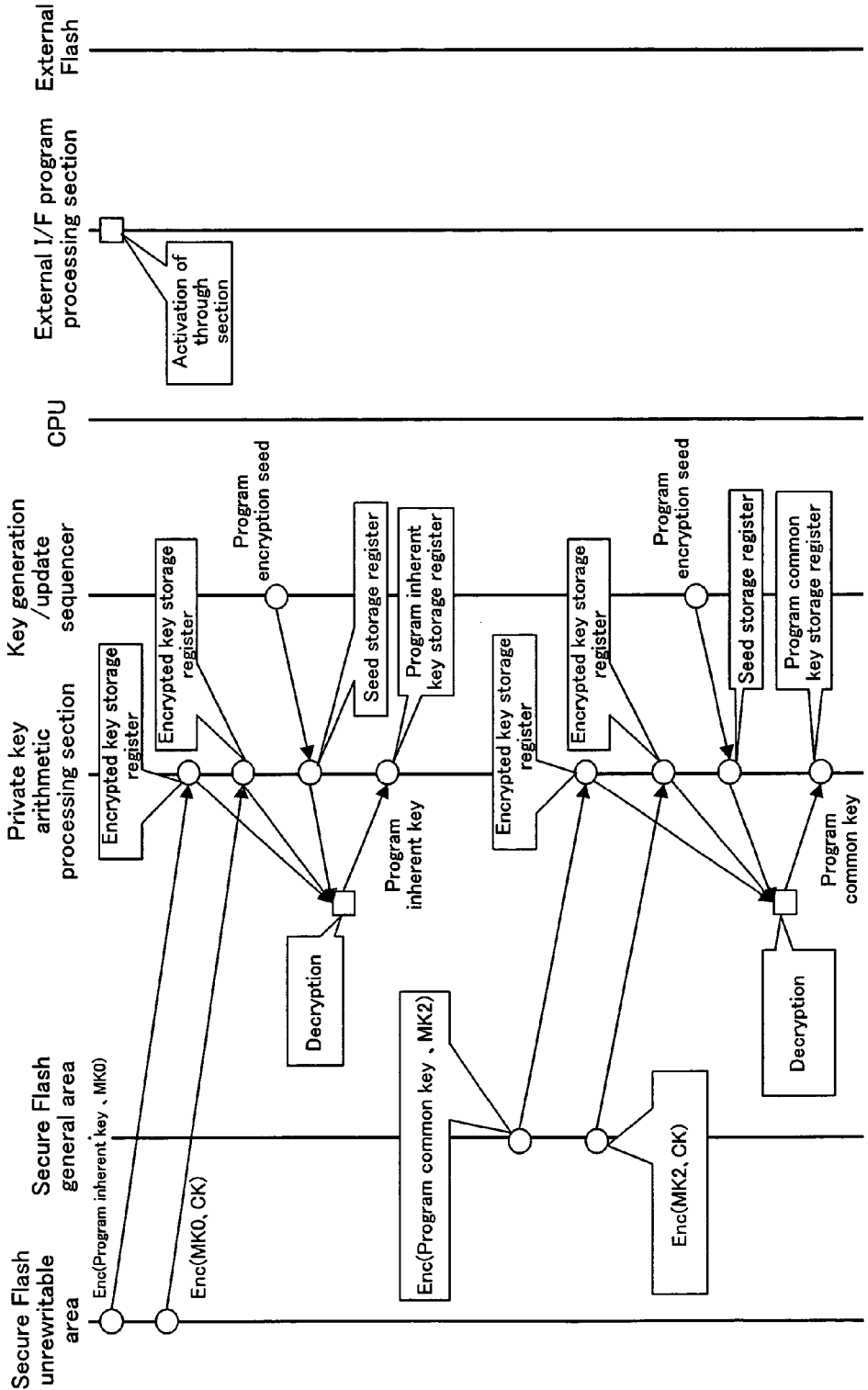
FIG. 6 is dataflow 1 of program installation processing SD1.
Figure 7:
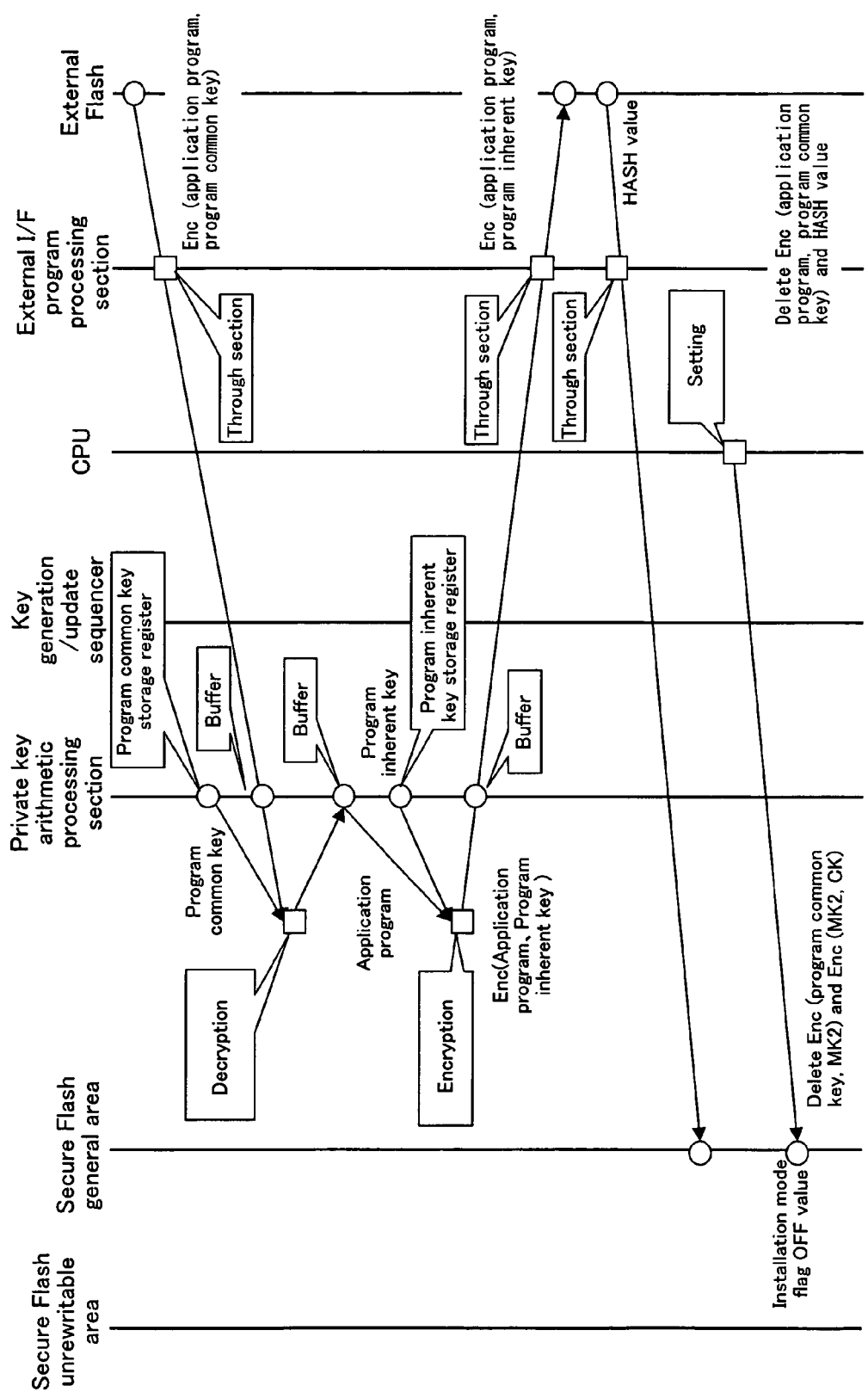
FIG. 7 is dataflow 2 of program installation processing SD1.

FIG. 5 is a flowchart of program installation processing SD1. FIGS. 6 and 7 illustrate a dataflow of program installation processing SD1. In program installation processing SD1, a program inherent key is decrypted using inherent key information stored in the secure memory 10 (SD11 and SD12), and a program common key is decrypted using common key information (SD13 and SD14). The decrypted program common key and the decrypted program inherent key are used to convert a program Enc (program, program common key), which is stored in the external memory 100, to a program Enc (program, program inherent key) (SD15 to SD17). Thereafter, the validity of the program is verified (SD18). If valid, the installation mode flag is set to OFF (SD19). With this setting, program installation processing SD1 is not performed any more at the time of boot-up of the secure LSI device 1. At the end of program installation processing SD1, the program common key stored in the secure memory 10 and the program Enc (program, program common key) stored in the external memory 100 are deleted (SD1A and SD1B).

Figure 8:
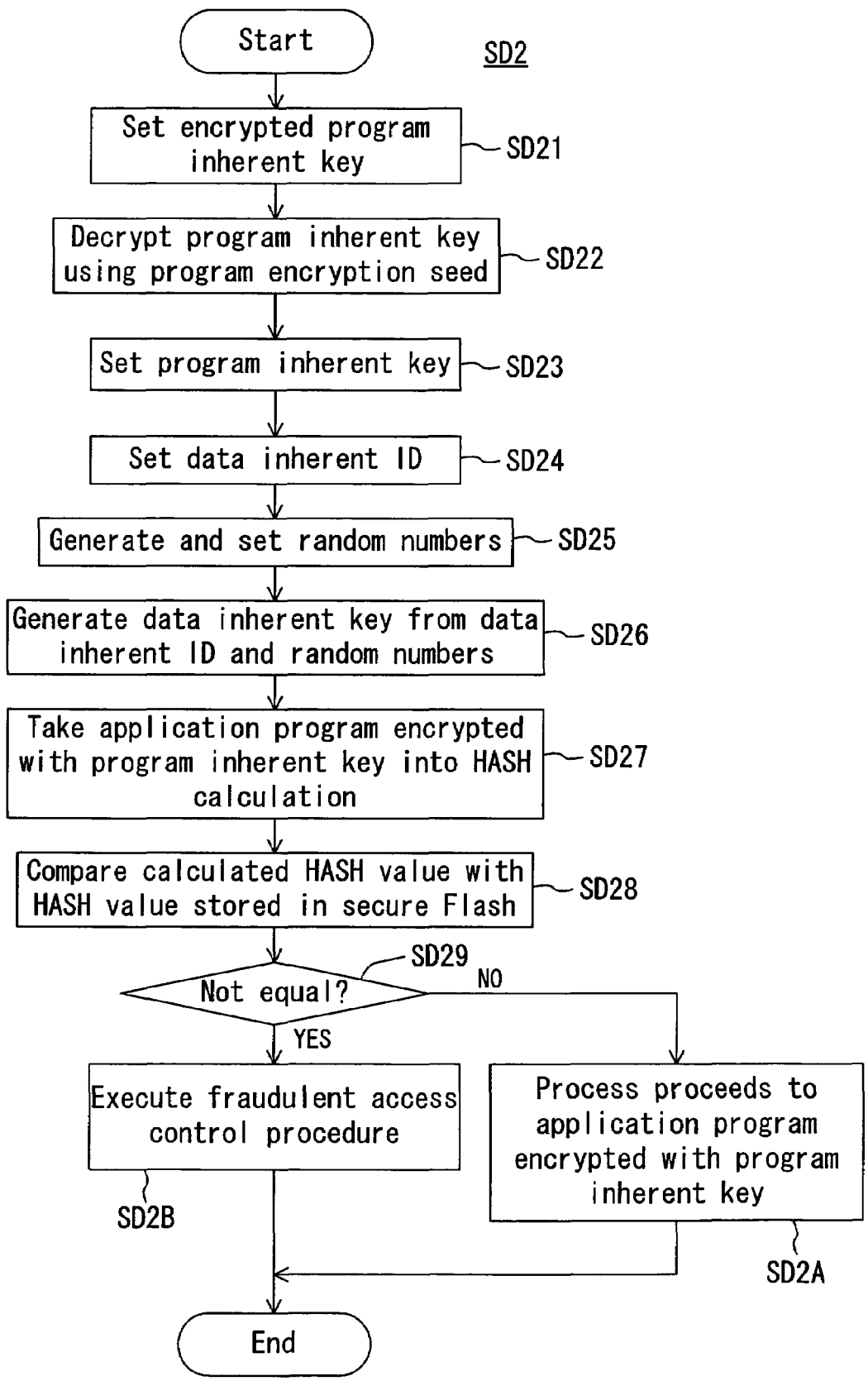
FIG. 8 is a flowchart of normal boot processing SD2 in the product operation mode.
Figure 9:
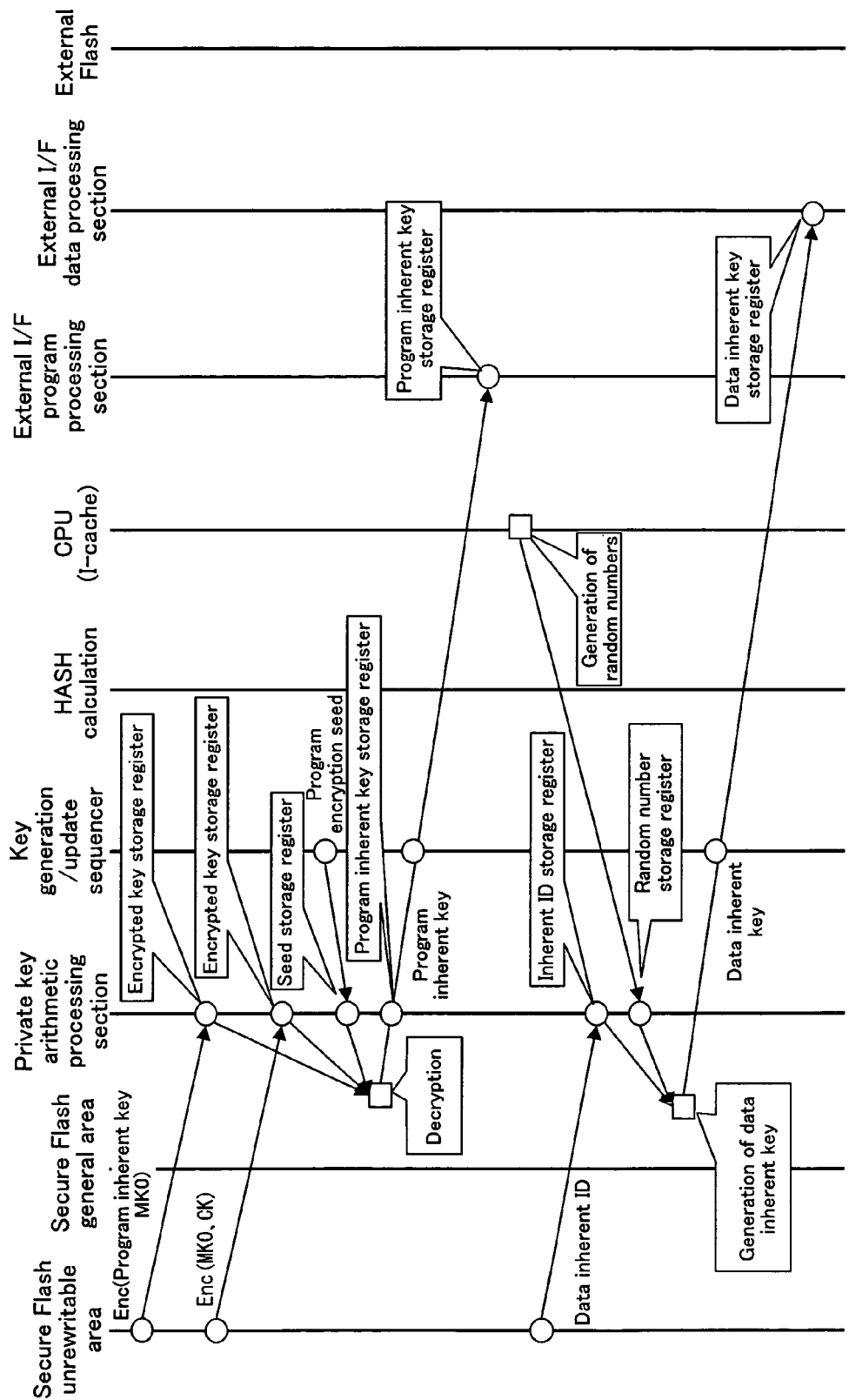
FIG. 9 is dataflow 1 of normal boot processing SD2.
Figure 10:
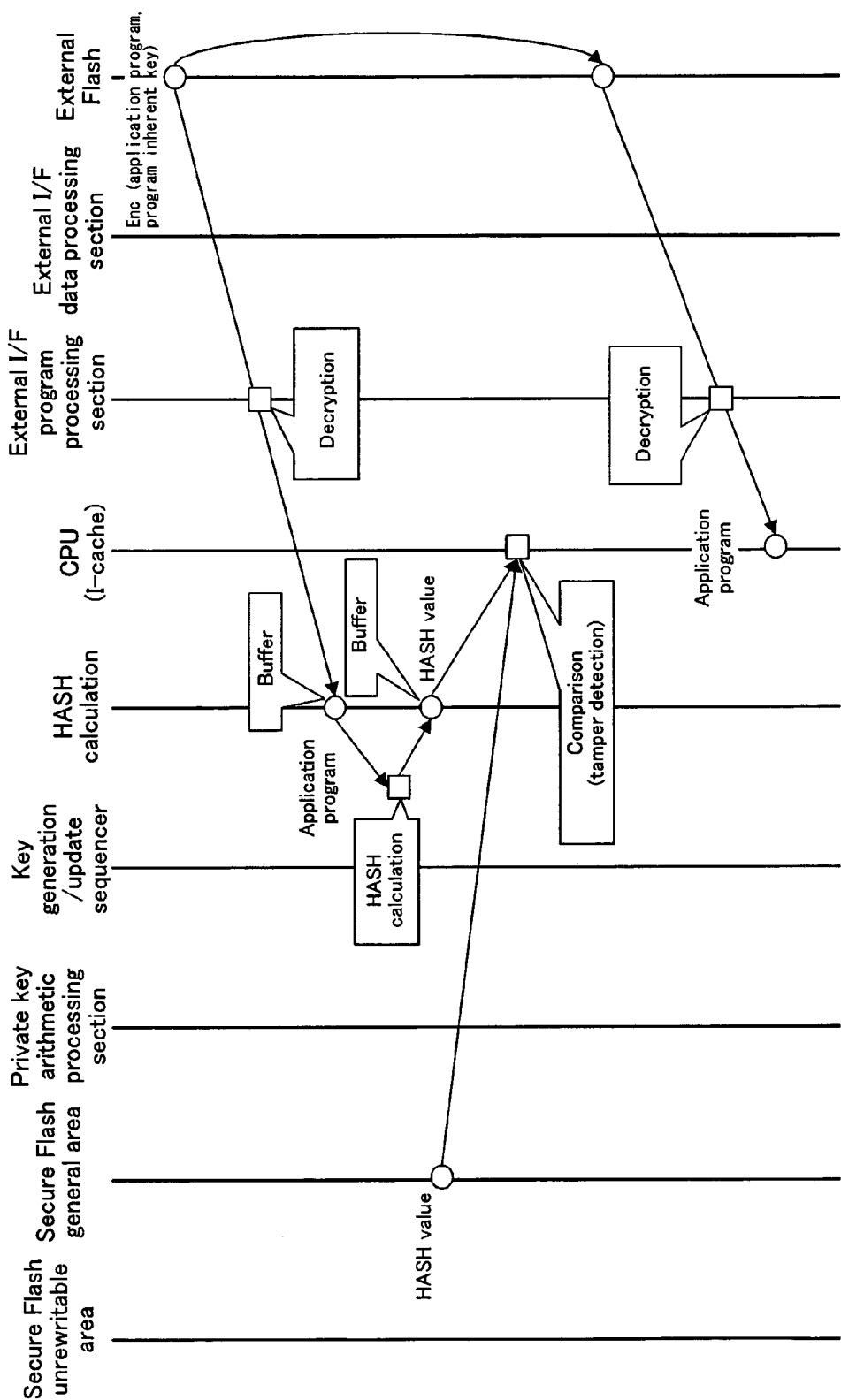
FIG. 10 is dataflow 2 of normal boot processing SD2.

FIG. 8 is a flowchart of normal boot processing SD2. FIGS. 9 and 10 illustrate a dataflow of normal boot processing SD2. In normal boot processing SD2, an encrypted program inherent key (inherent key information) stored in the unrewritable area 11 of the secure memory (internal memory) 10, i.e., an encrypted inherent key Enc (program inherent key (raw), MK0 (raw third intermediate key)) and an encrypted second intermediate key Enc (MK0, CK0 (raw fourth intermediate key)), are set in an encryption key storage register of the private key arithmetic processing section 20 (SD21). Then, the encrypted program inherent key is decrypted using the program encryption seed installed in the key-generation/update sequencer 30, whereby a program inherent key is obtained (SD22). The obtained program inherent key is set in the program inherent key storage register 22 of the private key arithmetic processing section 20 and in the program inherent key storage register 58 of the program decryption cryptography engine 54 of the external host I/F 50 (SD23).

Thereafter, a data inherent ID stored in the unrewritable area 11 of the secure memory 10 is set in the inherent ID storage register of the private key arithmetic processing section 20 (SD24). Further, random numbers are generated by the CPU 65, and the generated random numbers are set in the random number storage register of the private key arithmetic processing section 20 (SD25). Then, a data inherent key is generated from the data inherent ID and the random numbers by the private key arithmetic processing section 20 (SD26). Reproduction of a content is performed using the data inherent key. Since the data inherent key is generated using random numbers, the data inherent key differs at every boot-up. Thus, the safety in content reproduction is improved.

Thereafter, a program encrypted with a program inherent key, Enc (program, program inherent key), which is stored in the external memory 100, is decrypted through the program decryption cryptography engine 54 of the program processing section 51 of the external host I/F 50. The decrypted program is transferred to the HASH calculation section 70 to calculate the HASH value (SD27). The program inherent key stored in the program inherent key storage register 58 of external host I/F 50 is used for decryption. The calculated HASH value is compared with the HASH value stored in the general area 13 of the secure memory 10 to check whether or not the application program has been tampered (SD28). If the HASH values are equal to each other (No at SD29), the process proceeds to the program Enc (program, program inherent key) stored in the external memory 100 to execute an application (SD2A). If the HASH values are not equal to each other, it is determined that some fraud has been committed, and a fraudulent access control procedure is executed (SD2B).

Figure 11:
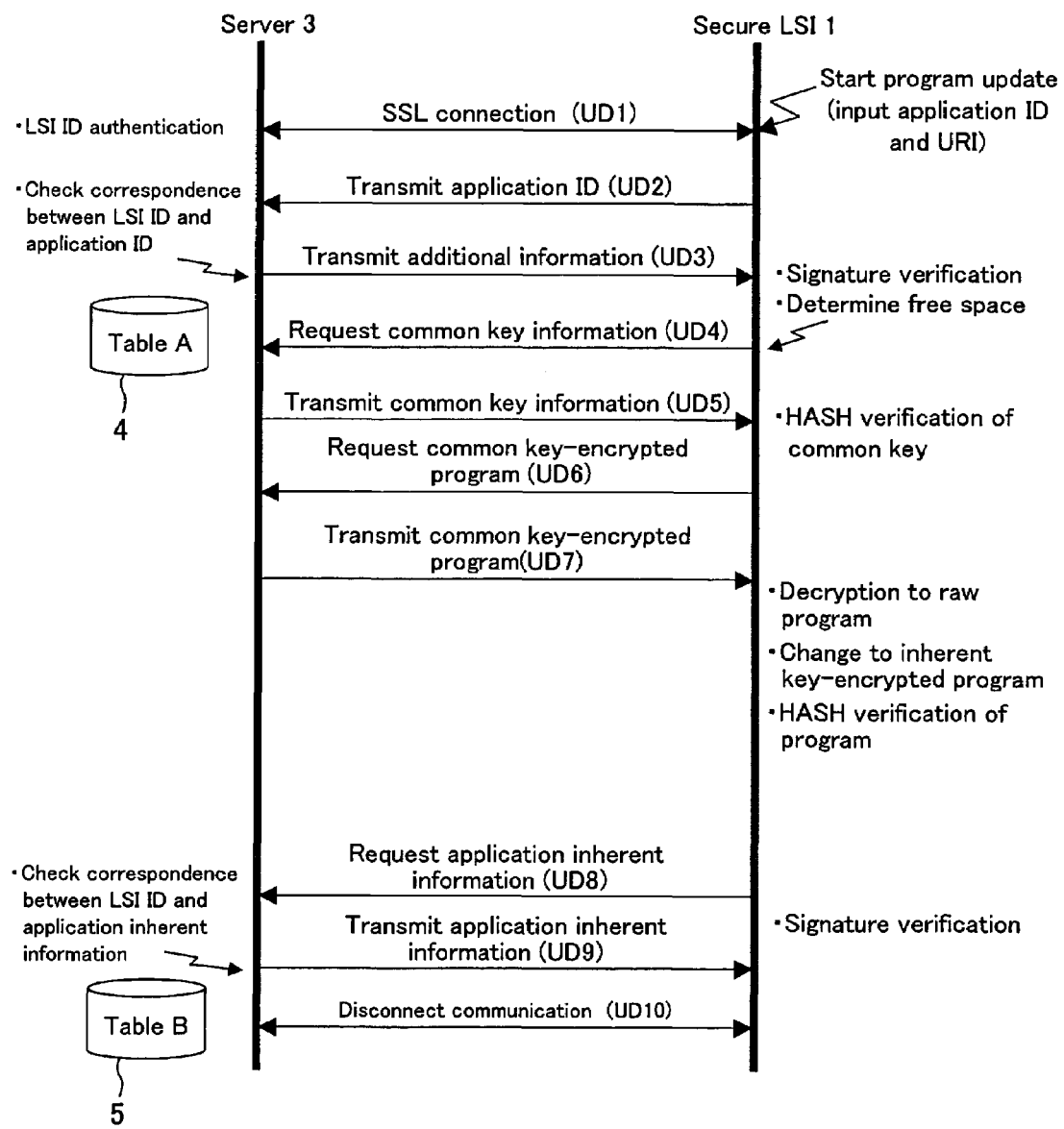
FIG. 11 is a flowchart which illustrates the communication between a secure LSI device and a server in the program update processing.

The processing of updating a program in a secure LSI device which operates as a product as described above is now described with reference to FIG. 11. FIG. 11 illustrates a flow showing transmission of data between the server 3 and a system including the secure LSI device 1 in the program update processing.

Referring to FIG. 11, after the secure LSI device 1 starts the program update processing, the server 3 receives an ID of the secure LSI device 1 from the system to perform ID authentication. When the ID is valid, the server 3 is SLL-connected to the secure LSI device 1 (UD1). With such a procedure, the safety of the communication path between the server 3 and the system including the secure LSI device 1 is secured to some extent.

After the communication path is secured, the system transmits an application ID, which is identification information of a program to be updated (hereinafter, referred to as "update object program"), to the server 3 (UD2). The server 3 manages a first table A 4 which indicates correspondences between application IDs of updatable programs and IDs of LSI devices on which a program is allowed to be executed. The server 3 determines whether or not a program may be transmitted based on the first table A 4. After the correspondence between the ID of the secure LSI device 1 and an application ID of a program requested to be updated is checked, the server 3 starts transmission of the update object program.

In the first place, the server 3 transmits additional information of the update object program to the secure LSI device 1 (UD3). Herein, the additional information includes a signature for authenticating whether or not a program is allowed to be updated in the secure LSI device 1, the size of the update object program, the HASH value (raw HASH value) of the update object program, etc. The secure LSI device 1 performs authentication using a signature transmitted as additional information and determines whether or not the external memory 100 has an updatable free space based on the transmitted program size. If it is determined that update is possible, the secure LSI device 1 requests the server 3 to transmit common key information (UD4).

Receiving the request, the server 3 transmits the common key information including an encrypted common key Enc (program common key (raw), MK1 (raw first intermediate key)) and an encrypted first intermediate key Enc (MK1, CK1 (raw second intermediate key)) to the secure LSI device 1 (UD5). The secure LSI device 1 decrypts the program common key using the common key information, and the HASH calculation is performed on the decrypted program common key to verify the validity of the program common key. After the program common key is successfully decrypted, the system requests the server 3 to transmit a common key-encrypted program (UD6). Receiving the request, the server 3 transmits a program Enc (program, program common key) to the system (UD7). The secure LSI device 1 converts the program Enc (program, program common key) to Enc (program, program inherent key). Further, the secure LSI device 1 decrypts the converted program (program, program inherent key) to a raw program. Then, the secure LSI device 1 performs a HASH calculation on the raw program and compares the obtained HASH value with a HASH value previously received as additional information to verify the validity of the program. The above processing is described later in detail.

After the common key-encrypted program is successfully converted to an inherent key-encrypted program, the system including the secure LSI device 1 requests the server 3 to transmit application inherent information (UD8). The application inherent information includes information necessary for executing a program. Thus, the secure LSI device 1 cannot execute an updated program without the application inherent information. The server 3 also manages a second table B 5 which indicates correspondences between a transmission history of the application inherent information and the IDs of the LSI devices. The server 3 does not transmit a plurality of pieces of application inherent information to the same secure LSI device. Thus, a single secure LSI device cannot update one program more than once.

When it is determined that the application inherent information may be transmitted, the server 3 transmits the application inherent information to the system including the secure LSI device 1 (UD9). The secure LSI device 1 performs a HASH calculation on the application inherent information to verify the validity of the application inherent information, whereby the program update processing is completed. The communication between the secure LSI device 1 and the server 3 is disconnected (UD10).

It should be noted that transmission of data between the secure LSI device 1 and the server 3 according to the present invention is not limited to the above-described data flow. For example, the server 3 does not necessarily manage the second table B 5 such that a plurality of pieces of application inherent information are transmitted to the same secure LSI. However, the confidentiality of a program is more improved when a single program is not transmitted to the same secure LSI more than once.

Further, the additional information, common key information, and common key-encrypted program are not always transmitted from the server 3 to the secure LSI device 1 separately. For example, a part or the entirety of these data may be transmitted at one time in the form of a program package.

Figure 12:
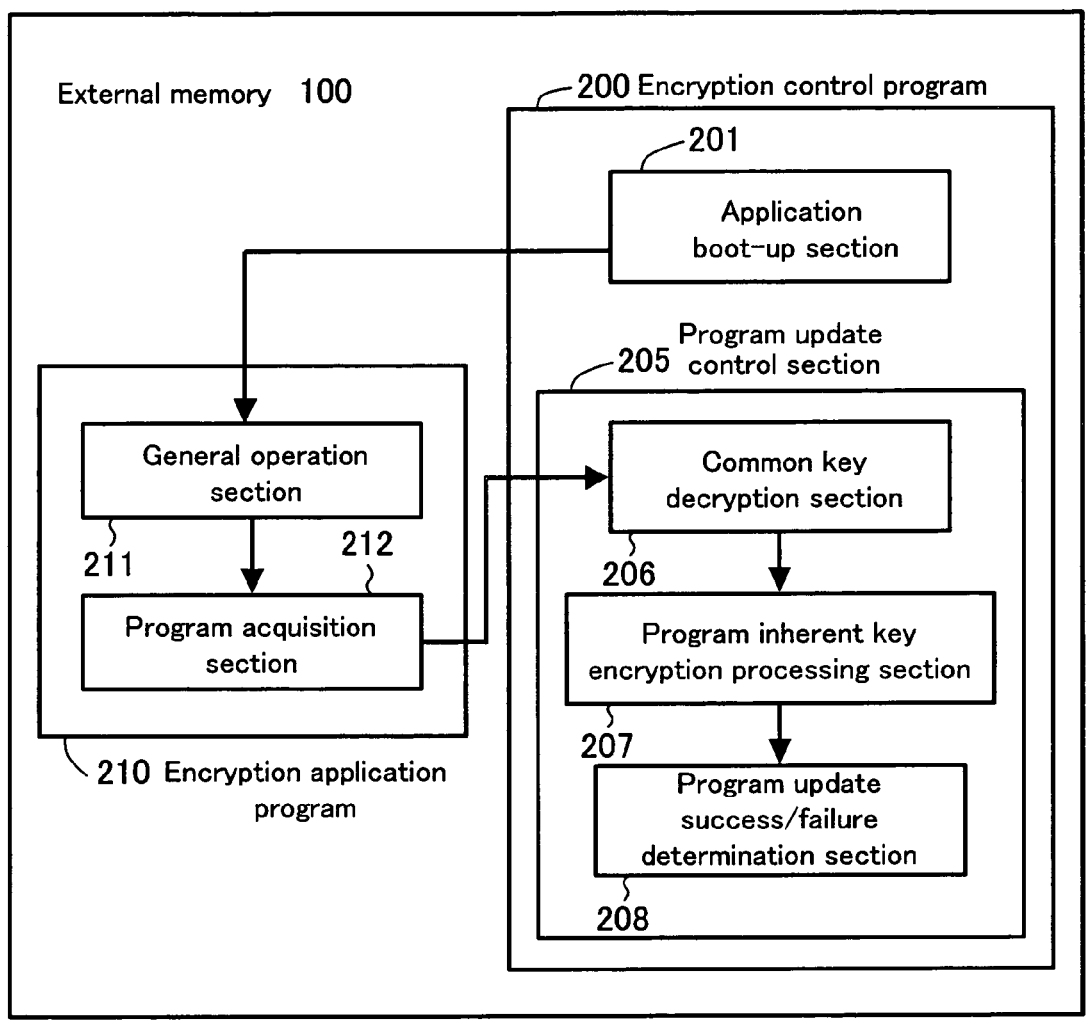
FIG. 12 shows a structure of a program used in connection with program update which is stored in an external memory 100.

The conversion from the common key-encrypted program Enc (program, program common key) to the inherent key-encrypted program Enc (program, program inherent key) the secure LSI device 1 is now described in detail with reference to the drawings. FIG. 12 illustrates a structure of a program used in connection with program update, which is stored in the external memory 100.

Referring to FIG. 12, the external memory 100 stores an encryption control program (Enc (control program, program inherent key)) 200 and an encryption application program (Enc (application program, program inherent key)) 210, which have been encrypted with an inherent key.

The encryption control program 200 includes an application boot-up section 201 and a program update control section 205. The program update control section 205 includes a common key decryption section 206, a program inherent key encryption processing section 207, and a program update success/failure determination section 208.

The application boot-up section 201 receives an instruction from a boot program stored in the boot ROM 60 to boot up the encryption application program 210. The common key decryption section 206 decrypts the program common key using the key-generation/update sequencer 30 based on the common key information transmitted from the server 3. The program inherent key encryption processing section 207 converts the common key-encrypted program Enc (program, program common key) to the inherent key-encrypted program Enc (program, program inherent key) using the key-generation/update sequencer 30. The program update success/failure determination section 208 decrypts the inherent key-encrypted program Enc (program, program inherent key) to a raw program and performs a HASH verification on the raw program to determine whether or not the program update has been successfully done. If successful, the old program is deleted, and information including an address where the updated program is stored, the size of the updated program, etc., are stored in the secure memory 10.

The encryption application program 210 includes a general operation section 211, which is a general application program, and a program acquisition section 212 which is an application program used for acquiring a new application program from a server or a recording medium. Such programs stored in the external memory 100 are used for program update.

FIG. 13 is a flowchart of program update processing which includes conversion processing from a common key-encrypted program to an inherent key-encrypted program.

If an update of a program is requested by an external factor, such as a user's operation, or the like, during the execution of an application program (SX1), the system detects the request, and the general operation section 211 activates the program acquisition section 212, which is an acquisition program of the encryption application program 210, in order to start a program update processing (SX2).

The program acquisition section 212 establish communication with the server 3 to establish authentication and acquire common key information and programs (SX3). Acquiring the common key information from the server 3, the common key decryption section 206 decrypts the program common key (SX4 and SX5). Specifically, the common key information, i.e., an encrypted program common key (Enc (program common key, MK2) and Enc (MK2, CK)), are set in the encryption key storage register 23 of the private key arithmetic processing section 20. The encrypted program common key is decrypted using the program encryption seed installed in the key-generation/update sequencer 30 to obtain a program common key. The obtained program common key is stored in the program common key storage register 21 of the private key arithmetic processing section 20.

Then, the program inherent key encryption processing section 207 performs conversion processing from a common key-encrypted program to an inherent key-encrypted program. Specifically, a program Enc (program, program common key), which has been transmitted from the server 3 and stored in the external memory 100, is transferred to the private key arithmetic processing section 20 through the encryption through section 52 of the program processing section 51 included in the external host I/F 50 (SX6). The transferred program is decrypted with the program common key stored in the program common key storage register 21 and then encrypted with the program inherent key stored in the program inherent key storage register 22, whereby a program Enc (program, program inherent key) is obtained. It should be noted that the program inherent key has already been decrypted at the time of boot up of the system as described above and stored in the program inherent key storage register 22 of the private key arithmetic processing section 20.

In the last, the program update success/failure determination section 208 determines whether or not the program update has been successfully done. Specifically, after the program Enc (program, program inherent key) is written in the external memory 100 (SX8), the program is decrypted using the program decryption cryptography engine 54 of the program processing section 51 included in the external host I/F 50 (SX9), and the HASH value of the decrypted program, i.e., raw program, is calculated (SX10). The calculated HASH value is compared with a HASH value obtained by the program acquisition section 212 together with the encrypted program, thereby determining whether or not the update processing has been successfully done (SX11). If successful, the old program is deleted (SX12). If failed, the transmitted program is deleted (SX13). Then, information including an address where the updated program is stored, the size of the updated program, etc., are stored in the secure memory 10 (SX14), whereby the update processing is completed.

In the case where the program common key-encrypted program is transmitted from the server using the above program update method, a key used for encryption is changed from a program common key to a program inherent key and installed in the system. Thus, even if the communication path between the server and the secure LSI device is fraudulently accessed and the program common key-encrypted program is stolen, the secure LSI device is not allowed to operate with this program. Furthermore, as a result of the program update, programs installed in different user products are programs encrypted with different inherent keys, and thus, the confidentiality is improved. Furthermore, even if a cipher (encryption) is broken, the number of products which can be damaged is restricted, and therefore, the security is improved as compared with conventional techniques.

In the present embodiment, the common key information is obtained from the server. This is because the decrypted program common key and the common key information stored in the secure memory 10 are deleted in the last step of program installation processing (SD1) that is performed in product operation mode "11". If these are not deleted, it is not necessary to obtain the common key information from the server, and the common key information may be read from the secure memory 10 and decrypted.

Furthermore, in the present embodiment, start of program update processing is instructed by an external factor, the general operation section 211 activates the program acquisition section 212, and after a program is acquired, respective processes are instructed by a boot program. However, the present invention is not limited to these. For example, a structure wherein the boot program activates the program acquisition section 212 further improves the security.

Furthermore, the program inherent key is not necessarily unique to each product, but may be unique to each product type or each set of products. The intention of the present invention is to reduce the damage which may be caused when a cipher (encryption) is broken in one product. The effects of the present invention are sufficiently achieved by decreasing the number of LSI devices which have programs encrypted with the same key. Furthermore, even when the program inherent key is common among all the products, the communication path is broken, and the common key-encrypted program is stolen, a secure LSI device is not allowed to operate without any additional processing. Thus, the sufficient effects can be achieved only by changing the encryption key from a common key to an inherent key.

As described above, according to the present invention, even in secure LSI devices with high confidentiality wherein a program is re-encrypted with an inherent key unique to each LSI device before it is executed, updating of the program can be achieved only by transmitting the same program from the server.

Furthermore, even if the communication path between the server and the secure LSI device is fraudulently accessed, and the common key-encrypted program is stolen, the secure LSI device is not allowed to operate with the program, and therefore, the confidentiality is improved. Furthermore, even if the cipher (encryption) is broken, the number of products which can be damaged is limited, and therefore, the security is improved as compared with the conventional techniques.

Further still, the validity of a common key or a program received from the server is verified using a raw HASH value. Thus, tampering of the raw HASH value is difficult as compared with tampering of an encrypted HASH value in the communication path. Therefore, the security is improved.

What is claimed is:

1. A method for updating a program in a system including an LSI device and an external memory, the method comprising:
   a step of transmitting by the system an ID, which is implemented before the program update, of the LSI device and an application ID which is identification information of an update object program to a server;
   a step of determining by the server whether or not the update object program may be transmitted based on the transmitted ID and application ID, and transmitting by the server additional information of the update object program if it is determined that the update object program may be transmitted;
   a step of determining by the system whether or not program update is possible based on the transmitted additional information, and requesting by the system that the server to transmit a common key-encrypted program generated by encryption with a common key if it is determined that program update is possible;
   a step of receiving by the system the common key-encrypted program transmitted from the server;
   a step of decrypting by the system the received common key-encrypted program to generate a raw program;
   a step of re-encrypting by the system the raw program with an inherent key unique to the LSI device and storing the re-encrypted program in the external memory as a new inherent key-encrypted program;
   a step of determining whether updating the program was successfully performed; and
   a step of deleting old program from a secure memory and writing information about the update object program into the secure memory if it is determined that updating the program was successfully performed.

2. The program update method of claim 1, further comprising the steps of:
   receiving by the system common key information transmitted from the server; and
   generating by the system a raw common key using the received common key information,
   wherein at the decrypting step, the raw common key is used to decrypt the common key-encrypted program.

3. The program update method of claim 2, wherein the common key information includes an encrypted common key generated by encrypting the raw common key with a raw first intermediate key, and an encrypted first intermediate key generated by encrypting the raw first intermediate key with a raw second intermediate key.

4. The program update method of claim 1, wherein:
   the LSI device includes an internal memory in which inherent key information is stored;
   the system uses the inherent key information stored in the internal memory to generate a raw inherent key at boot-up of the system; and
   at the re-encrypting step, the raw inherent key is used for re-encrypting the raw program.

5. The program update method of claim 4, wherein the inherent key information includes an encrypted inherent key generated by encrypting the raw inherent key with a raw third intermediate key and an encrypted second intermediate key generated by encrypting the raw third intermediate key with a raw fourth intermediate key.

6. The program update method of claim 4, wherein the generated raw inherent key is stored in a register of the LSI device and is used for decrypting the inherent key-encrypted program to a raw program for execution of the inherent key-encrypted program.

7. The program update method of claim 1, wherein:
   the LSI device includes a boot ROM in which a boot program is stored;
   the external memory includes an acquisition program for establishing data transmission between the LSI device and a server; and
   the system executes reception of the common key-encrypted program based on the acquisition program stored in the external memory, and controls update processing performed after the reception of the common key-encrypted program based on the boot program stored in the boot ROM.

8. The program update method of claim 1, further comprising the step of receiving a HASH value of the raw program transmitted from the server,
   wherein at the decrypting step, the received HASH value is used to perform a HASH verification on the decrypted raw program.

* * * * *